Patented June 5, 1951

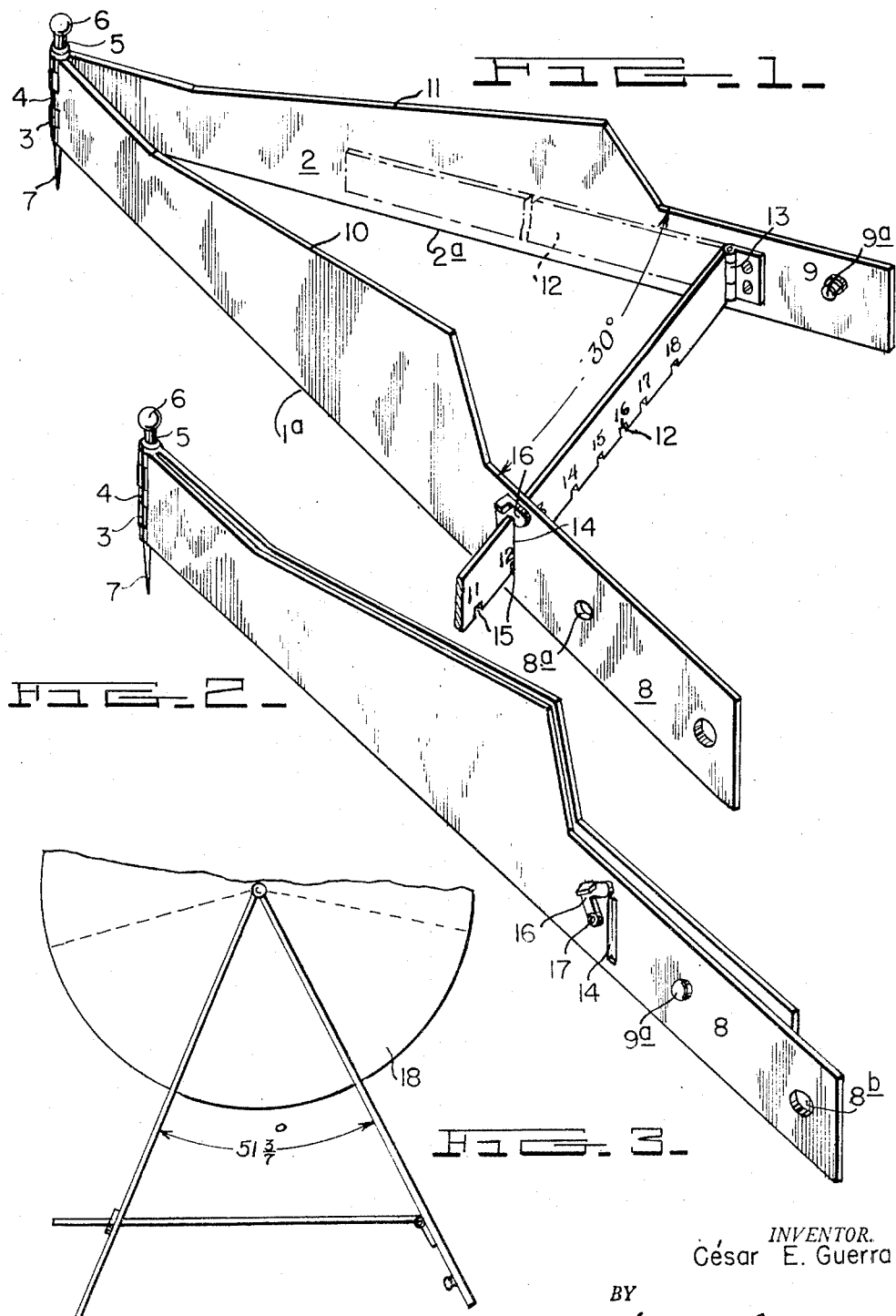

2,555,690

UNITED STATES PATENT OFFICE 2,555,690

CAKE AND PASTRY SECTOR CUTTER

Cesár E. Guerra, Habana, Cuba

Application September 23, 1947, Serial No. 775,619
In Cuba June 16, 1947

8 Claims. (Cl. 30—114)

The present invention relates to a sector cutting device for cutting pastries of generally circular shape, such as pies and cakes, into any desired number of equal parts or segments.

In the past the cutting of pastries of circular shape has been more or less guesswork depending upon the accuracy of the eye or perhaps the whim of the person doing the cutting. This has been particularly true as regards the cutting of pieces of the uneven numbers, i. e. 5, 7, 9, etc. As to these, there is no idea beforehand as to the exact number of parts and their size which will exist upon completion of the cutting operation. Such irregularity very definitely contributes to the disappointment of one and the glee of another, especially within a family household where cake or pie cutting is a serious affair which requires an accurate eye and a steady hand.

Heretofore there has been no device for cutting pastry of circular shape, such as cakes and pies, into true sectors of a definite size and number. It is known that slice cutting devices for butter and cheese exist which consist of two hinged blades held in angular spaced relation by a graduated arc-shaped link. That link is graduated for setting the blades to cut a slice of a given weight depending upon the density of the cheese or butter being cut. However these devices do not achieve the object of dividing and cutting circular products into true sectors of predetermined known size and number. Furthermore they do not insure freedom from a wasteful remnant end portion.

One of the very important objects of this invention is the provision of a cutter for cakes and pastries or the like, the cut of which can be set to cut circular cakes and pastries into an equal number of sectors with assurance that no waste or unequal part will exist after cutting.

A further object of the invention is to provide a true sector cutting device for cakes and pastries which can be folded into compact form for storing away when not in use.

Another object of the invention is to provide a sector cutting device which requires a minimum number of parts and is simple yet efficient in its use.

The striking advantage of the sector cutting device of the present invention resides in the fact that the person manipulating the cutter is assured, upon a definite setting of the blades in angular spaced relation in accordance with the divisions provided upon the graduated measuring member corresponding to the number of equal parts into which he wishes the cake to be divided, that the whole will be cut into the number of equal parts or true sectors corresponding to the number desired, leaving no remainder or waste.

The above and additional features and advantages are described and claimed in the following specification and claims, and are illustrated in the accompanying drawings, in which:

Fig. 1 is a perspective view showing the cutter with the blades set in position to cut a cake or pastry into twelve equal sector parts;

Fig. 2 is a perspective view showing the blades of the sector cutting device in folded position; and Fig. 3 is a plan view of the sector cutter showing its application to a circular cake with the blades of the cutter set in position to cut the entire cake into seven equal sectors.

Referring to the drawings, the sector cutting device consists of two cutting blades, 1 and 2, made of any suitable material, but preferably made of metal. The blades 1 and 2 are provided with respective cutting edges 1a and 2a and are hinged together at their meeting ends by means of the inter-engaging knuckles 3 and 4 having a pintle pin 5 extending through the inter-engaging knuckles 3 and 4. The pintle pin 5 of the hinge has a rounded head 6 and a pointed end 7 and is of a length somewhat longer than the width of the blades 1 and 2 at their meeting or hinged ends with the pointed end 7 extending below the hinge so that it may penetrate at the center of the material to be cut. The ends of the blades 1 and 2 opposite the hinged ends are formed into handle portions 8 and 9 for manipulating the sector cutting device. The upper edges of the blades 1 and 2 are inclined upwardly and rearwardly as at 10 and 11 from a point near the hinged ends of the blades to a point near the handles 8 and 9 to give greater width to the middle section of the blades so as to give support to sectors cut from cakes of substantial depth.

A straight link or gauge member 12 is hinged at 13 to the surface of the blade 2 near its handle portion 9. Referring to Figure 1, it will be seen that the member 12 is adapted to be folded against the surface of the blade 2 in parallel relation thereto so that the blades may be folded flat against each other for ready storage while not in use, as shown in Figure 2.

For maintaining the blades 1 and 2 in this folded position, a button 9a is secured to the handle 9 and is adapted to enter snapping engagement with a hole 8a in the handle 8 of the opposing blade 1. Near the end of the handle 8 is a hole 8b for conveniently hanging the folded cutter while not in use.

The member 12, when in extended position, as shown in Figure 1, is adapted to extend through a vertical slot 14 in the handle portion 8 of the blade 1. Along the lower edge of the member 12 are a series of notches 15 corresponding to the graduations along member 12 and adapted to engage the bottom edge of vertical slot 14 in the handle 8 of the blade 1. A latch member 16 is pivoted at 17 near the slot 14 and is adapted to engage the upper edge of the member 12, thereby locking member 12 against movement with respect to the blades 1 and 2.

The location of the graduations with the corresponding notches 15 of the member 12 are based on the geometrical theorem that in a given circle, the area of the sectors is proportional to the arc or cord that joins the radii of said sector, that is, to a greater arc corresponds a greater area, and vice-versa. Therefore with the member 12 extending in the slot 14 and locked by the latch 16 at the graduation No. 12, as shown in Fig. 1, a cake can be cut into twelve equal sectors with no remainder or waste. This is 30° of the whole circumference of the circle. The number of sectors into which the cake or pie, as the case may be, is desired to be cut can be determined beforehand. The member 12 is adjusted to that particular graduation thereby locking the blades 1 and 2 in the proper angular spaced relation, with the assurance that the product will be divided into an equal number of sectors with no remainder or waste.

Fig. 3 shows the sector cutting device in its application to a cake 18 of circular shape with the blades 1 and 2 of the cutter adjusted in angular spaced relation to cut the cake 18 into seven equal sectors or parts, about 51 3/7 degrees of the circle.

In using this sector cutting device, the point 7 is thrust downwardly into the center of the circular cake or pie to be cut and gentle but firm pressure downwardly is applied to the upper edges of the cutting elements 1 and 2. A similar effect can be obtained by placing the point 7 as directed above and applying downward pressure on the handle portions 8 and 9 while concurrently pressing downwardly on the portions of the cutting elements 1 and 2 adjacent to the pintle pin 6. It will be obvious that the center point of the cake or pastry to be cut can be determined by locating two imaginary cross diametric lines. Similarly also if this device is applied to the cake or pastry so that the radius is measured outwardly from the pintle pin equally along the cutting members 1 and 2, it will be obvious that the hinged end with the pintle pin will be positioned approximately at the center.

I claim:

1. In a cake and pastry sector cutting device, the combination of a pair of cutting blades hinged together at their meeting ends and provided with cutting edges, handle portions provided at the ends of said blades opposite the hinged ends for manipulating said sector cutting device, adjustable connecting means comprising a straight graduated measuring member hingedly secured to one blade member at its handle portion on the vertical face of said blade next adjacent the other blade, said measuring member and said other blade having surfaces adapted to interengage whereby said measuring member when in a measuring position engages said other blade and maintains said cutting blades in a given angular spaced relation.

2. In a cake and pastry sector cutting device, the combination of a pair of cutting blades hinged together at their meeting ends and having lower edges adapted to serve as cutting edges, adjustable connecting means comprising a straight graduated measuring member mounted on one blade and on the face thereof next adjacent the other blade and adapted to be swung to a position in which it will lie flat against the vertical face of the blade on which it is mounted when said cutting blades are in closed position, said measuring member and said other blade having surfaces adapted to interengage whereby said measuring member when in a measuring position engages said other blade and maintains said cutting blades in a given angular spaced relation.

3. In a cake and pastry sector cutting device, the combination of a pair of cutting blades hinged together at their meeting ends and provided with cutting edges, the opposite ends of said blades forming handle portions for manipulating said sector cutting device, adjustable connecting means associated with said blades, said adjustable connecting means comprising a straight graduated measuring member hingedly secured to one blade member at its handle portion on the surface of said blade next adjacent the opposing blade, whereby said graduated measuring member will lie flat against said surface when said cutting blades are in closed position, said opposing blade having a vertical slot in its handle portion for receiving the graduated measuring member when in its extended position, said graduated measuring member having notches provided on its lower edge corresponding to the graduations on said measuring member and adapted to engage the bottom edge of said slot upon adjustment, and a latch member pivotally secured to the surface of said opposing blade near said slot adapted to lock said measuring member in said slot when placed in a predetermined position, thereby maintaining said cutting blades in a given angular spaced relation.

4. In a cake and pastry sector cutting device, the combination of a pair of cutting blades hinged together at their meeting ends and having a pintle pin and provided with cutting edges, the opposite ends of said blades forming handle portions for manipulating said sector cutting device, the pintle pin of said hinge consisting of a member pointed at one end and of a length somewhat longer than the width of the blades at their meeting ends and with the pointed end extending below said hinge, adjustable connecting means associated with said blades, said adjustable connecting means comprising a straight graduated measuring member hingedly secured to one blade member at its handle portion on the surface of said blade next adjacent the opposing blade, whereby said graduated measuring member will lie flat against said surface when said cutting blades are in closed position, said opposing blade having a vertical slot provided in its handle portion for receiving the graduated measuring member when in its extended position, said graduated measuring member having notches provided on its lower edge corresponding to the graduations on said measuring member and adapted to engage the bottom edge of said slot upon adjustment, and a latch member pivotally secured to the surface of said opposing blade near said slot and adapted to lock said measuring member in said slot when placed in a predetermined position, thereby maintaining said cutting blades in a given angular spaced relation.

5. In a cake and pastry sector cutting device, the combination of a pair of cutting blades hinged together at their meeting ends and provided with cutting edges, the opposite ends of said blades forming handle portions for manipulating said sector cutting device, adjustable connecting means associated with said blades, said adjustable connecting means comprising a straight graduated measuring member hingedly secured to one blade member at its handle portion on the surface of said blade next adjacent the opposing blade, whereby said graduated measuring member will lie flat against said surface when said cutting blades are in closed position, said opposing blade having a vertical slot in its handle portion for receiving the graduated measuring member when in its extended position, said graduated measuring member having notches provided on its lower edge corresponding to the graduations on said measuring member and adapted to engage the bottom edge of said slot upon adjustment, and means secured to the surface of said opposing blade near said slot adapted to lock said measuring member in said slot when placed in a predetermined position, thereby maintaining said cutting blades in a given angular spaced relation.

6. In a cake and pastry sector cutting device, the combination of a pair of cutting blades hinged together at their meeting ends and provided with cutting edges, the opposite ends of said blades forming handle portions for manipulating said sector cutting device, adjustable connecting means associated with said blades, said adjustable connecting means comprising a straight graduated measuring member hingedly secured to one blade member at its handle portion on the surface of said blade next adjacent the opposing blade, whereby said graduated measuring member will lie flat against said surface when said cutting blades are in closed position, said opposing blade having a vertical slot in its handle portion for receiving the graduated measuring member when in its extended position, said measuring member having means adapted to cooperate with said vertical slot to thereby maintain said cutting blades in a given angular spaced relation.

7. In a cake and pastry sector cutting device, the combination of a pair of cutting blades hinged together at their meeting ends and provided with cutting edges, extensions from said blades constituting handle portions for manipulating said sector cutting device, adjustable connecting means between said blades comprising a straight graduated measuring member mounted on the face of one blade member adjacent its handle portion and extending between the adjacent faces of said blades and adapted to engage and cooperate with the other blade to maintain said blades in a given angular spaced relation while they are used in a cutting operation, said other blade having an opening therethrough, and said measuring member being adapted to extend through said opening and to be fixed with respect to said other blade at predetermined points along the length of said measuring member to maintain said cutting blades in a given angular spaced relation.

8. In a cake and pastry sector cutting device, the combination of a pair of cutting blades hinged together at their meeting ends and provided with cutting edges, the opposite ends of said blades forming handle portions for manipulating said sector cutting device, adjustable connecting means between said blades comprising a straight graduated measuring member extending from one blade at its handle portion and mounted on the face thereof next adjacent the other blade, said other blade having a vertical slot in its handle portion for receiving the graduated measuring member when in its extended position, said measuring member having means adapted to cooperate with said vertical slot to thereby maintain said cutting blades in a given angular spaced relation.

CÉSAR E. GUERRA.

REFERENCES CITED

The following references are of record in the file of this patent:

UNITED STATES PATENTS

| Number | Name | Date |
|---|---|---|
| 1,117,453 | Serrell | Nov. 17, 1914 |
| 2,264,486 | Smith et al. | Dec. 2, 1941 |

FOREIGN PATENTS

| Number | Country | Date |
|---|---|---|
| 593,869 | Germany | Mar. 5, 1934 |